United States Patent [19]

Buhrer

[11] 4,240,010

[45] Dec. 16, 1980

[54] ELECTRODELESS FLUORESCENT LIGHT SOURCE HAVING REDUCED FAR FIELD ELECTROMAGNETIC RADIATION LEVELS

[75] Inventor: Carl F. Buhrer, Framingham, Mass.

[73] Assignee: GTE Laboratories Incorporated, Waltham, Mass.

[21] Appl. No.: 49,773

[22] Filed: Jun. 18, 1979

[51] Int. Cl.³ .................... H05B 41/16; H05B 41/24
[52] U.S. Cl. ....................................... 315/248; 315/57; 315/70; 315/85; 336/226; 336/232
[58] Field of Search ............... 315/248, 344, 39, 57, 315/85, 70; 336/226, 232

[56] References Cited

U.S. PATENT DOCUMENTS

| | | | |
|---|---|---|---|
| 1,807,927 | 6/1931 | Morrison | 315/248 X |
| 1,813,580 | 7/1931 | Morrison | 315/248 X |
| 2,471,777 | 5/1949 | Reinartz | 336/226 X |
| 2,939,049 | 5/1960 | Blackman | 315/248 X |
| 3,942,058 | 3/1976 | Haugsjaa et al. | 315/248 |
| 3,942,068 | 3/1976 | Haugsjaa et al. | 315/248 |
| 3,943,404 | 3/1976 | McNeill et al. | 315/248 |
| 3,987,334 | 10/1976 | Anderson | 315/248 |
| 3,987,335 | 10/1976 | Anderson | 315/248 |
| 4,017,764 | 4/1977 | Anderson | 315/248 |
| 4,053,856 | 10/1977 | Fisher et al. | 336/226 |
| 4,117,378 | 9/1978 | Glascock, Jr. | 315/248 |
| 4,119,889 | 10/1978 | Hollister | 315/248 |
| 4,171,503 | 10/1979 | Kwon | 315/344 |
| 4,187,445 | 2/1980 | Houston | 315/248 |
| 4,187,447 | 2/1980 | Stout et al. | 315/85 |

*Primary Examiner*—Saxfield Chatmon, Jr.
*Attorney, Agent, or Firm*—William R. McClellan

[57] ABSTRACT

An electrodeless fluorescent light source includes an electrodeless fluorescent lamp and an induction coil wherein the magnitude of the far field electromagnetic radiation, produced directly by the induction coil, is minimized. The induction coil includes current loops which are configured so that the magnetic dipole moment of each current loop is offset by the magnetic dipole moment of other current loops in order to minimize the net magnetic dipole moment of the induction coil. One embodiment of the induction coil includes a conductor wound in the shape of a square prism. The current on adjacent side edges of the prism is in opposite directions, thus resulting in two pairs of mutually opposing magnetic dipole moments.

14 Claims, 6 Drawing Figures

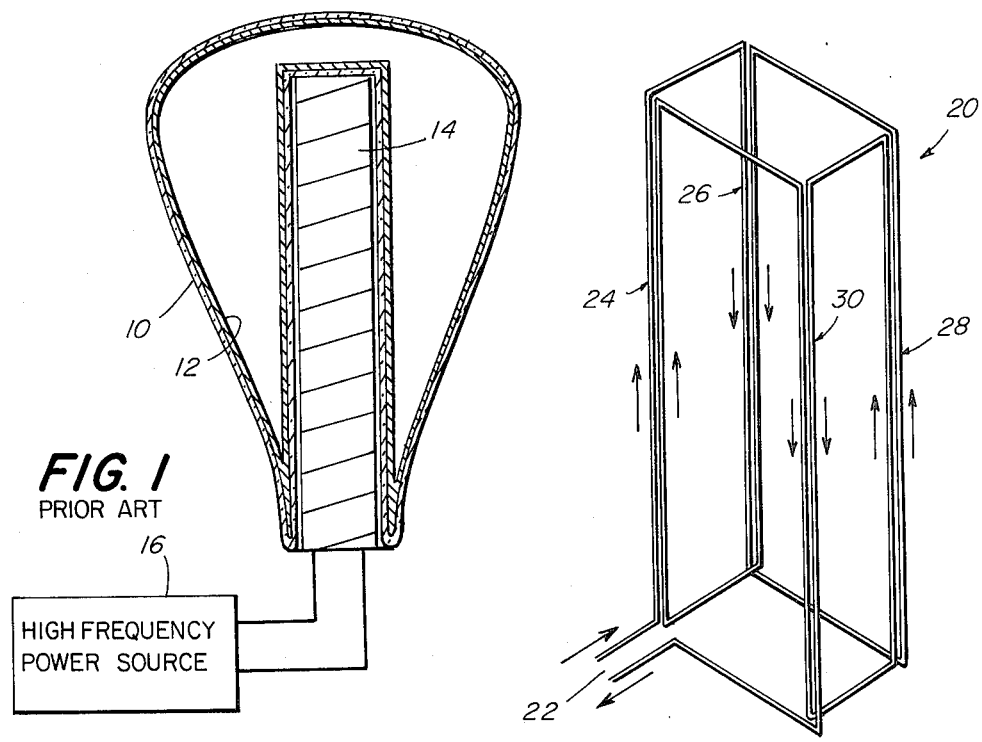
FIG. 1 PRIOR ART
FIG. 2
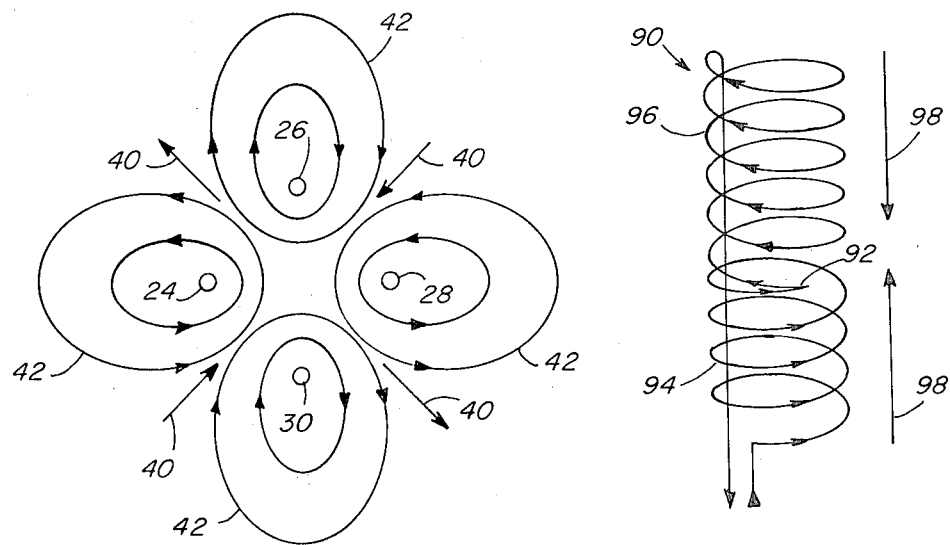
FIG. 3
FIG. 6

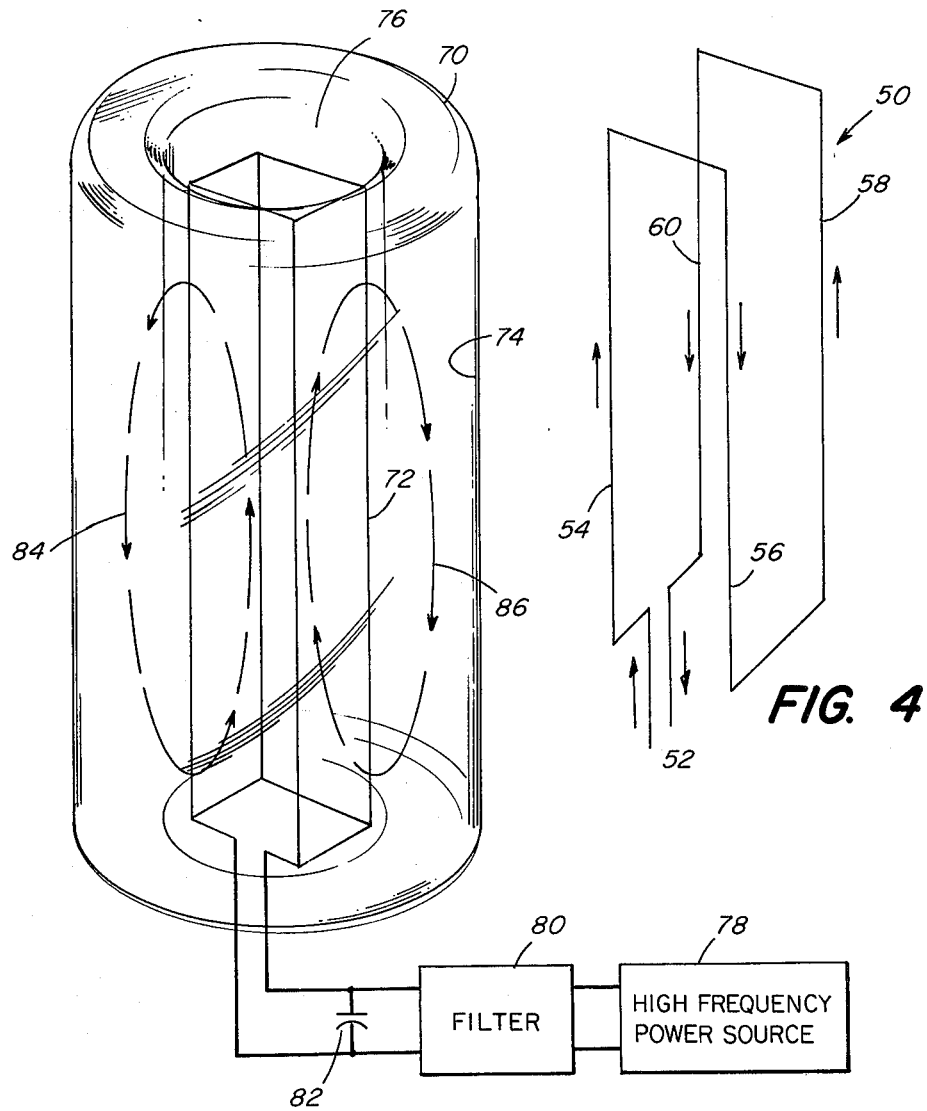

ELECTRODELESS FLUORESCENT LIGHT SOURCE HAVING REDUCED FAR FIELD ELECTROMAGNETIC RADIATION LEVELS

CROSS-REFERENCE TO RELATED APPLICATION

C. F. Buhrer, "Planar Electrodeless Fluorescent Light Source", assignee's docket no. 21,593, filed concurrently with the present application and assigned to the same assignee as the present application, discloses electrodeless fluorescent light sources having a planar structure and having for excitation an induction coil which produces minimal far field electromagnetic radiation levels.

BACKGROUND OF THE INVENTION

This invention relates to electrodeless fluorescent light sources excited by high frequency power. More particularly, this invention relates to electrodeless fluorescent light sources having reduced far field radiation levels.

Conventional high brightness fluorescent lamps provide long life and efficient operation but require large, heavy and expensive ballasting circuits for operation at line frequencies. The low pressure glow discharge in mercury vapor that provides the phosphor excitation in fluorescent lamps is usually powered by a current at the power line frequency between two internal emissive electrodes. Current control is required because of the negative impedance characteristic of the discharge, and this is obtained by means of the series inductive impedance of an iron core ballast. In addition, as one attempts to make small fluorescent lamps, power losses connected with the electrodes become an increasingly large fraction of the applied power. Electrodeless excitation of the glow discharge by radio frequency fields has the potential advantage of providing a light weight system by eliminating the usual ballast. Also, without the usual filaments, lamp life would be increased.

Several approaches to electrodeless fluorescent lamps have been taken in the past. In one approach, frequencies in the range of 10 to 500 KHz were used with ferrite structures designed to link the high frequency magnetic field through a closed loop of plasma discharge. In U.S. Pat. No. 3,500,118 issued Mar. 10, 1970 to Anderson and U.S. Pat. No. 3,521,120 issued July 21, 1970 to Anderson, there are disclosed electrodeless fluorescent light sources which utilize a magnetically induced radio frequency electric field to ionize a gaseous radiating medium. Ferrite cores are utilized to couple energy to the discharge. A great variety of geometries is possible. For example, the use of closed loop ferrite core circuits to minimize stray fields that can radiate was disclosed in U.S. Pat. No. 4,005,330 issued Jan. 25, 1977 to Glascock, Jr. et al.

In a second approach, the frequencies are in the 3 to 300 MHz range, and no ferrites are needed. In U.S. Pat. No. 4,010,400 issued Mar. 1, 1977 to Hollister, radio frequency power is coupled to a discharge medium contained in a phosphor coated envelope by an induction coil with a nonmagnetic core connected to a radio frequency source. Radiation by the magnetic dipole field of the excitation coil is a problem.

A third approach to electrodeless fluorescent light sources, utilizing even higher frequencies in the 100 MHz to 300 GHz range, was disclosed by Haugsjaa et al. in pending U.S. application Ser. No. 959,823 filed Nov. 13, 1978 and assigned to the assignee of the present invention. High frequency power, typically at 915 MHz, is coupled to an ultravioletproducing low pressure discharge in a phosphor-coated electrodeless lamp which acts as a termination load within a termination fixture. Electromagnetic radiation is less of a problem at the higher frequencies of operation because shielding can be accomplished with a fine conductive mesh which blocks only a small percentage of the light output. At lower frequencies of operation, such as those disclosed in the Hollister patent, a heavier conductive mesh is required to accomplish effective shielding because of the reduced skin effect at lower frequencies. The heavier mesh is impractical because more of the light output is blocked.

Regardless of the frequency range utilized for exciting the glow discharge of a fluorescent lamp the control of electromagnetic radiation at the operating frequency and its harmonics is of high priority. In the low frequency range, a lamp system utilizing a free running class C oscillator coupled through a coil or ferrite structure to a discharge radiates harmonics randomly dispersed through the 500–1600 KHz broadcast band and gives severe radio interference. In the higher frequency range, the effect is similar, but the interference is to other classes of radio and television services. In general, therefore, the operating frequency should be fixed and chosen for electromagnetic compatibility, the power source should be well shielded with its output filtered to remove harmonics, and the coupling system and glow discharge geometry should be chosen to minimize radiation. The power source aspect of this problem was recognized in U.S. Pat. No. 4,048,541 issued Sept. 13, 1977 to Adams et al wherein a power source for an electrodeless fluorescent lamp was designed to eliminate second harmonics.

SUMMARY OF THE INVENTION

It is an object of the present invention to provide improved electrodeless fluorescent light sources wherein high frequency power is inductively coupled to the discharge and wherein the far field electromagnetic radiation produced directly by the induction coil is minimized.

According to the present invention, this and other objects and advantages are achieved in an electromagnetic discharge apparatus including an electrodeless lamp and means for excitation of the discharge in the electrodeless lamp by high frequency power. The electrodeless lamp has an envelope made of a light transmitting substance. The lamp envelope has on its inner surface a phosphor coating which emits visible light upon absorption of ultraviolet radiation and encloses a fill material which emits ultraviolet radiation during electromagnetic discharge. The excitation means includes induction coil means located in sufficiently close proximity to the electrodeless lamp to cause discharge. The induction coil means includes a plurality of current loops, each having an individual magnetic dipole moment, which emits electromagnetic radiation, and has a net magnetic dipole moment which is the vector sum of said individual magnetic dipole moments. The current loops are configured so that each individual magnetic dipole moment is offset by other individual magnetic dipole moments in order to minimize said net magnetic dipole moment. In this way, the magnitude of the far field electromagnetic radiation, produced directly by said induction coil means, is minimized.

BRIEF DESCRIPTION OF THE DRAWINGS

In the Drawings:

FIG. 1 is a simplified sectional view of an electrodeless fluorescent light source according to the prior art.

FIG. 2 is a perspective view of an induction coil according to one embodiment of the present invention.

FIG. 3 is a top view of the induction coils shown in FIG. 2 illustrating pictorially the magnetic fields and magnetic dipole moments.

FIG. 4 is a perspective view of an induction coil according to another embodiment of the present invention.

FIG. 5 is a perspective view of a light source in accordance with the present invention.

FIG. 6 is a side view of an induction coil according to another embodiment of the present invention.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

A typical prior art electrodeless fluorescent light source is shown in FIG. 1. It includes an electrodeless lamp 10 with a phosphor coating 12, an induction coil 14, and a high frequency power source 16. The electrodeless lamp 10 has an envelope made of a light transmitting substance such as glass and encloses a fill material such as mixtures of mercury and an inert gas which emit ultraviolet light during discharge. High frequency power is coupled to the discharge by induction coil 14. The phosphor coating 12 on the inner surface of lamp 10 emits visible light upon absorption of ultraviolet light from the discharge. Such a light source is shown in U.S. Pat. No. 4,010,400. The induction coil 14 is wound in a helical configuration and radiates an appreciable amount of energy at the frequency of operation.

According to the present invention, unique configurations of the induction coil are utilized to reduce the radiated high frequency energy. Referring now to FIG. 2, there is shown an induction coil 20 having the general shape of a square prism. As used in this disclosure, the term "induction coil" is intended to include any configuration of an elongated conductor which has the purpose of coupling magnetic fields to an electrodeless lamp and is not limited to a series of spirals or rings. The induction coil 20 is formed from insulated wire and can be supported by an insulating form of dielectric material. Alternatively, the induction coil 20 can be formed from wire which has sufficient stiffness to be self-supporting. Regardless of how the induction coil 20 is supported, it can be visualized as outlining an imaginary square prism which has four rectangular side faces and two square end faces. The prism thus has four side edges formed by the intersections of the four side faces. As shown in FIG. 2, the conductor forming induction coil 20 starts at input 22 and runs up edge 24, across the top of the prism and down edge 26. The conductor then runs across the bottom of the prism, up edge 28, across the top of the prism, and down edge 26. From here, the conductor runs across the bottom of the prism, up edge 24, across the top of the prism, and down edge 30. Finally, the conductor runs across the bottom of the prism, up edge 28, across the top of the prism, down edge 30, and across the bottom of the prism to input 22. This configuration results in two conductors along each side edge of the square prism. While other winding sequences can be used, the important requirement is that current at any instant of time must flow in opposite directions on adjacent side edges and in the same direction on diagonally opposite side edges of the prism. The direction of current flow at one instant of time on side edges 24, 26, 28 and 30 is shown in FIG. 2 by the arrows parallel to the conductors. The current in edges 24 and 28 is up whereas the current in edges 26 and 30 is down. The indicated directions of current flow, of course, reverse with time because of the alternating input current.

The induction coil 20 results in a much lower level of far field radiation than the helical coil used in the prior art. Considering individually each side face of the prism, current circulates around that face and produces a dipole radiation pattern. FIG. 3 is a top view of induction coil 20 and illustrates the magnetic dipole moment 40 produced by the current loop on each face of the prism. Also shown in FIG. 3 are the magnetic filed lines 42 generated by induction coil 20. The fields produced by adjacent conductors are of opposite polarity. These are the fields which interact with the electrodeless lamp fill material as will be discussed hereinafter. The dipole moments from opposite sides of the prism also are of opposite polarity. Thus, when viewed from the far field, or distances much greater than the dimensions of induction coil 20, the dipole contribution from each face of the prism is offset by the contribution from the opposite face to give a net dipole moment of approximately zero. The resulting dipole radiation field in a practical induction coil 20 is not exactly zero because of imperfections in the coil construction and because of second order effects. One requirement for the above discussion to hold true is that the length of the conductor used to form induction coil 20 be small in comparison with the wavelength at the frequency of operation. This is necessary to insure that there is no phase retardation between radiation from dipole moments on opposite faces of the prism. It is also required that the separation between opposite faces of the prism be small in comparison with the wavelength of the excitation signal. Therefore, when an electrodeless fluorescent light source is operated at 40.68 MHz, which has a wavelength of about 7.4 meters, the maximum dimensions of induction coil 20 should be a few centimeters to avoid problems of phase retardation.

The induction coil 20 shown in FIG. 2 is one example of induction coil geometries which meet the requirements of the present invention. The essential requirement is that each dipole moment be offset by one or more dipole moments of opposite polarity to minimize the net magnetic dipole moment so that the far field electromagnetic radiation level produced directly by the induction coil is minimized. The net magnetic dipole moments of the induction coil is the vector sum of the individual magnetic dipole moments produced by each current loop of the induction coil. Thus, the prism-shaped induction coil can have a rectangular base as well as a square base. Also, the side faces of the prism can be parallelograms as well as rectangles. The dipole moments produced by opposite faces of such induction coils offset each other. In general, the base of the prism-shaped induction coil can be regular polygonal where the polygon has an even number of sides, for example, regular hexagonal or regular octagonal. An induction coil in the shape of a regular polygonal prism according to the present invention has an even number of side faces and an even number of side edges formed by the intersections of the side faces. The conductor forming the induction coil is configured to run parallel to and coincide with the side edges in such a direction that, at any instant of time, current in the conductor on adjacent side edges of the coil flows toward opposite ends of the coil. The dipole moment produced by the conductor on each face of the regular polygonal prism is offset by the dipole moment of one or more other conductors. In the case of a rectangular induction coil, the dipole moment produced by each face is offset by the dipole moment of the opposite face. However, in the case of a regular hexagonal induction coil, the dipole moments offset each other in groups of three.

The maximum number of sides on the prism-shaped induction coil has two limitations. The first, discussed above, is that the conductor length must be short in relation to the wavelength of operation. This is harder to meet as the number of sides on the prism increases, and requires smaller dimensions, and a lower operating frequency. The second limitation, to be discussed later, relates to problems of effective excitation of the electrodeless lamp. Another variation to any of the induction coils discussed above is to repeat the winding pattern one or more times, thereby increasing the inductance of the coil. Based on the above considerations, preferred dimensions of square prismatic induction coils are in the range of 1 cm to 5 cm square by 2 cm to 10 cm in length.

A simplified version of induction coil 20 is shown in FIG. 4 as induction coil 50. It is similar to induction coil 20 in that it generally out lines the form of a square prism, but the conductor passes only once along each side edge of the prism. The conductor starts at input 52, runs along edge 54, across the top of the prism and down edge 56. The conductor then runs across the bottom of the prism, up side edge 58, across the top of the prism, and down side edge 60 to input 52. This configuration meets the requirement, stated above, that the current on adjacent side edges of the prism be in opposite directions at any instant of time.

While the conductor on each face of the prism does not form a complete loop, the current flow in the side edges of each face results in a dipole moment which is offset by the dipole moment of the opposite face. Thus, this configuration also has a net dipole moment of nearly zero and the far field electromagnetic radiation level is minimal.

An electromagnetic discharge apparatus according to the present invention is shown in FIG. 5 as an electrodeless fluorescent light source. The light source includes an electrodeless lamp 70 and a means for excitation of discharge in electrodeless lamp 70 by high frequency power. The excitation means includes an induction coil 72 which can be either of those shown in FIG. 2 or FIG. 4 and described above or any other configuration which is configured to minimize the net magnetic dipole moment of the induction coil so that the magnitude for the far field electromagnetic radiation, produced directly by the induction coil is minimized. Electromagnetic radiation emitted by the discharge inside electrodeless lamp 70 and by the phosphor coating is not suppressed by the present invention. The electromagnetic radiation produced directly by the induction coil is in the frequency range from 1 to 100 MHz and harmonics thereof, as discussed hereinafter. Induction coil 72 must be in sufficiently close proximity to electrodeless lamp 70 to cause discharge. That is, a substantial percentage of the magnetic field produced by induction coil 72 must be within electrodeless lamp 70.

Electrodeless lamp 70 has an envelope made of a light transmitting substance, such as glass, and encloses a fill material which emits ultraviolet light upon excitation by high frequency power. The inner surface 74 of the envelope has a phosphor coating which emits visible light upon absorption of ultraviolet light. The phosphor coating can be any of the conventional phosphors used in commerical fluorescent lamps of the electroded type. The electrodeless lamp 70 shown has the shape of a cylinder with a cavity 76 extending through its center for insertion of induction coil 72. The lamp 70 can have other shapes provided the induction coil 72 is sufficiently close to couple power to the discharge in the electrodeless lamp. For example, the lamp can be similar in shape to that shown in FIG. 5, but can have a cavity extending only partially through the center of the lamp. Also, the lamp can be similar in shape to a standard incandescent lamp, that is, pear-shaped, with a cavity for induction coil 72. In another configuration, a tubular electrodeless lamp is placed inside the induction coil. The fill material for electrodeless lamp 70 is typically an inert gas, such as argon, under low pressure and mercury which mixture emits ultraviolet radiation upon excitation by high frequency power.

The light source shown in FIG. 5 can include a high frequency power source 78 which has its output coupled to induction coil 72. The power source 78 is in the frequency range from 1 MHz to 100 MHz. Two preferred frequencies of operation are 13.56 MHz and 40.68 MHz which are both in ISM (Instrument, Scientific and Medical) bands set aside for devices such as the light source herein disclosed. The power source 78 should have a stable output frequency and preferably be crystal controlled to avoid interference with radio services. Any suitable high frequency power source can be used, such as the power source shown in U.S. Pat. No. 4,048,541 issued Sept. 13, 1977 to Adams et al. The high frequency power source 78 can be mechanically packaged with electrodeless lamp 70 and induction coil 72 to produce a complete fluorescent light source having a 60 Hz line frequency input. The light source according to the present invention can also include a filter 80 having its input coupled to the output of power source 78 and its output coupled to induction coil 72. The purpose of filter 80 is to remove harmonics and other spurious outputs of high frequency power source 78, thereby reducing electromagnetic radiation at frequencies other than that chosen for operation of the light source. Filter 80 is typically a low-pass filter having a cutoff frequency just above the operating frequency. A capacitor 82 can be connected across induction coil 72 to tune it to resonance at the frequency of operation.

In operation, the oscillating magnetic field generated by induction coil 72 penetrates the inner wall of electrodeless lamp 70 and induces a circulating plasma current just outside the four side faces of induction coil 72. Two loops of plasma current 84 and 86 are illustrated in FIG. 5. Adjacent plasma current loops, such as 84 and 86, are of opposite phase. These regions of plasma emit ultraviolet radiation which excites the phosphor coating to produce visible light.

The limitations, discussed above, on the geometry of induction coil 72 are related to excitation of the lamp as well as to the far field level of electromagnetic radiation. The plasma currents discussed above exist in the near field regions adjacent to each conductive segment of induction coil 72. As one moves further from a particular segment, the contribution to the field strength from other segments begins to take effect and reduce the net field. Thus, the plasma current is reduced. As the conductive segments are moved closer together, as is the case in the higher order polygonal coil geometry discussed above, the plasma current region is constricted closer to the induction coil 72. Since it is desirable to have the plasma current fill the entire lamp volume for effective light production, this plasma current constriction is to be avoided.

An electrodeless fluorescent light source constructed in accordance with the present invention utilized an electrodeless lamp of the shape shown in FIG. 5. The lamp had an outside diameter of 4.7 cm, an inside diameter of 2.5 cm and a length of 13 cm. The fill material included 3 milligrams of mercury and 6 torr of neon which included 0.1% argon. The phosphor coating was a blend of two high temperature phosphors which can maintain efficiency to at least 250° C. The phosphor consisted of 60 weight percent of $(Y, Eu)_2 O_3$ and 40 weight percent of $(Ce, Tb)MgAl$ oxide. The induction coil was of the type shown in FIG. 4 and was sufficiently large to fill the inner cavity of the electrodeless lamp. When operated at an input frequency of 40.68 MHz, the light source produced approximately 8000 lumens with 200 watts of input high frequency power.

An alternative embodiment of an induction coil 90 according to the present invention is shown in FIG. 6. Coil 90 is of the general type having helical or spiral windings. However, the coil winding reverses direction at the midpoint 92 of induction coil 90 so that the lower half 94 is wound in one direction while the upper half 96 is wound in the opposite direction. Such a winding configuration produces the dipole moments 98 shown in FIG. 6. Since the lower half 94 and the upper half 96 of induction coil 90 are wound in opposite directions, the magnetic dipole moments are of opposite polarity and offset each other in the far field. Thus, the level of electromagnetic radiation produced by induction coil 90 in the far field is nearly zero as discussed above. Induction coil 90 can be used in the light source shown in FIG. 5 or in similar configurations. Induction coil 90 generates two plasma current loops in an electrodeless lamp. Both loops are concentric with induction coil 90 but flow in opposite directions. One plasma loop is adjacent to the upper half 96 of induction coil 90 and the second plasma loop is adjacent to the lower half 94 of induction coil 90.

While there has been shown and described what is at present considered the preferred embodiments of the invention, it will be obvious to those skilled in the art that various changes and modifications may be made therein without departing from the scope of the invention as defined by the appended claims.

What is claimed is:

1. An electromagnetic discharge apparatus comprising:
   an electrodeless lamp having an envelope made of a light transmitting substance, said envelope having on its inner surface a phosphor coating which emits visible light upon absorption of ultraviolet radiation, said envelope enclosing a fill material which emits ultraviolet radiation during electromagnetic discharge; and
   means for excitation of the discharge in said electrodeless lamp by high frequency power, said excitation means including induction coil means located in sufficiently close proximity to said lamp to cause discharge, said induction coil means including a conductor configured to generally outline the shape of a regular polygonal prism having an even number of side faces and an even number of side edges formed by the intersections of said side faces, said conductor being configured to run parallel to and coincide with said side edges in such a direction that, at any instant of time, current in the conductor on adjacent side edges of said prism flows toward opposite ends of said prism, said induction coil means thereby including a plurality of current loops, each having an individual magnetic dipole moment which emits electromagnetic radiation, and having a net magnetic dipole moment which is the vector sum of said individual magnetic dipole moments, said current loops being configured so that each individual magnetic dipole moment is offset by other individual magnetic dipole moments in order to minimize said net magnetic dipole moment, whereby the magnitude of the far field electromagnetic radiation, produced directly by said induction coil means, is minimized.

2. The electromagnetic discharge apparatus as defined in claim 1 wherein said excitation means further includes a high frequency power source having its output coupled to said induction coil means.

3. The electromagnetic discharge apparatus as defined in claim 1 wherein said regular polygonal prism is a square prism.

4. The electromagnetic discharge apparatus as defined in claim 3 wherein said excitation means further includes a high frequency power source having its output coupled to said induction coil means.

5. The electromagnetic discharge apparatus as defined in claim 4 wherein said excitation means further includes, coupled to the output of said high frequency power source, means for reducing harmonic frequency components of the output power produced by said source.

6. The electromagnetic discharge apparatus as defined in claim 5 wherein said excitation means further includes, coupled to said induction coil means, means for tuning said induction coil means to resonance.

7. The electromagnetic discharge apparatus as defined in claim 6 wherein said high frequency power source is in the range from 1 MHz to 100 MHz.

8. The electromagnetic discharge apparatus as defined in claim 3 wherein said electrodeless lamp has a cavity therein and said induction coil is located in said cavity.

9. An electromagnetic discharge apparatus comprising:
   an electrodeless lamp having an envelope made of a light transmitting substance, said envelope having on its inner surface a phosphor coating which emits visible light upon absorption of ultraviolet radiation, said envelope enclosing a fill material which emits ultraviolet radiation during electromagnetic discharge; and
   means for excitation of the discharge in said electrodeless lamp by high frequency power, said excitation means including induction coil means located in sufficiently close proximity to said lamp to cause discharge, said induction coil means including a conductor configured to generally outline the shape of a rectangular prism having four side faces and four side edges formed by the intersections of said side faces, said conductor being configured to run parallel to and coincide with said side edges in such a direction that, at any instant of time, current in the conductor on adjacent side edges of said prism flows toward opposite ends of said prism and current in the conductor on diagonally opposite side edges of said prism flows toward the same end of said prism, said induction coil means thereby including a plurality of current loops, each having an individual magnetic dipole moment which emits electromagnetic radiation, and having a net magnetic dipole moment which is the vector sum of said individual magnetic dipole moments, said current loops being configured so that each individual magnetic dipole moment is offset by other individual magnetic dipole moments in order to minimize said net magnetic dipole moment, whereby the magnitude of the far field electromagnetic radiation, produced directly by said induction coil means, is minimized.

10. The electromagnetic discharge apparatus as defined in claim 9 wherein said electrodeless lamp has a cavity therein and said induction coil is located in said cavity.

11. The electromagnetic discharge apparatus as defined in claim 10 wherein said excitation means further includes a high frequency power source having its output coupled to said induction coil means.

12. An electromagnetic discharge apparatus comprising:
an electrodeless lamp having an envelope made of a light transmitting substance, said envelope having on its inner surface a phosphor coating which emits visible light upon absorption of ultraviolet radiation, said envelope enclosing a fill material which emits ultraviolet radiation during electromagnetic discharge; and means for excitation of the discharge in said electrodeless lamp by high frequency power, said excitation means including induction coil means located in sufficiently close proximity to said lamp to cause discharge, said induction coil means including a conductor configured in a generally helical form, said conductor being wound one-half in a clockwise direction and one-half in a counterclockwise direction, said induction coil means thereby including a plurality of current loops, each having an individual magnetic dipole moment which emits electromagnetic radiation, and having a net magnetic dipole moment which is the vector sum of said individual magnetic dipole moments, said current loops being configured so that each individual magnetic dipole moment is offset by other individual magnetic dipole moments in order to minimize said net magnetic dipole moment, whereby the magnitude of the far field electromagnetic radiation, produced directly by said induction coil means, is minimized.

13. The electromagnetic discharge apparatus as defined in claim 12 wherein said electrodeless lamp has a cavity therein and said induction coil is located in said cavity.

14. The electromagnetic discharge apparatus as defined in claim 13 wherein said excitation means further includes a high frequency power source having its output coupled to said induction coil means.

* * * * *